United States Patent Office 3,636,020
Patented Jan. 18, 1972

3,636,020
METHOD FOR PREPARING DIORGANIC MERCURY COMPOUNDS
Robert C. Wade, Ipswich, Mass., assignor to Ventron Corporation, Beverly, Mass.
No Drawing. Filed Aug. 21, 1969, Ser. No. 852,099
Int. Cl. C07f 3/12
U.S. Cl. 260—433   13 Claims

ABSTRACT OF THE DISCLOSURE

The invention provides an improved method for preparing diorganic mercury compounds. The method comprises disproportionating an organic mercury salt by contacting the organic mercury salt with a polyamine, such as a polyethyleneimine having a molecular weight between about 600 and 100,000, ethylenediamine, diethylenetriamine, triethylenetetraamine, and propylenediamine in water thereby forming the water-insoluble diorganic mercury compound and a water-soluble mercury-polyamine complex. The diorganic mercury compound may be separated and recovered from the reaction mixture by filtration, layer separation, or distillation.

---

This invention relates to an improved method for preparing diorganic mercury compounds. These compounds are useful in organometallic chemistry for the preparation of organic derivatives of other metals.

Diorganic mercury compounds have previously been prepared by synthetic methods from organic mercury salts and involving Grignard reagents which must be used in ether solvents under strictly anhydrous conditions.

The present invention is based upon the discovery that when organic mercury salts are contacted with a polyamine in water, the organic mercury salt disproportionates spontaneously to form the water-insoluble diorganic mercury compound and a water-soluble mercury-polyamine complex. The use of polyethyleneimines having a molecular weight between about 600 and 100,000, which are commercially available from Dow Chemical Company under the tradename "PEI," are preferred in carrying out this reaction. However, I have found that any polyamine whose carbon-to-nitrogen ratio is about 2 to 1 are operable. Examples of other polyamines include ethylenediamine, diethylenetriamine, triethylenetetraamine, and propylenediamine. The disproportionation of the organic mercury salt may be illustrated in the following manner:

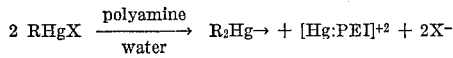

where R can be any alkyl or aryl group, such for example as methyl, ethyl, propyl, butyl, amyl, hexyl, phenyl, tolyl, xylyl, mesityl, naphthyl, and substituted aryl groups, such as aminoaryls, nitroaryls and halogen substituted aryl group, such as o-, m-, p-chlorophenyl, etc. The anion, X, in the organic mercury salt may be selected from acetate, benzoate, hydroxide, oxide, chloride, bromide, iodide, nitrate, etc.

The amount of polyamine necessary to effect the complete reaction may vary with the selected polyamine and organic mercury salt but is not less than required to form a complex represented by the formula:

with half of the mercury atoms initially provided for the reaction. The polyamine, Dow PEI-6, a polyamine of molecular weight about 600, is generally preferred in this reaction and is used in the ratio of at least 1.5 parts by weight polyamine per part of organic mercury salt. An excess of polyamine may be used without detriment since it is soluble in water and is easily separated and recovered from the diorganic mercury product by filtration, layer separation, or distillation.

The reaction takes place at room temperature, although in some cases it is advantageous to warm the reaction mixture up to 40–50° C. Heating to higher temperatures often causes some reduction of mercury in the water-soluble polyamine complex which will contaminate the water-insoluble diorganic mercury product.

The invention is illustrated further by the following specific examples.

EXAMPLE 1

One gram of phenylmercuric acetate was dispersed in 3 g. of the polyamine Dow PEI-6 having a molecular weight of about 600. Then, 10 ml. of water was added. The temperature of the mixture spontaneously increased from about 20° C. to about 50° C. due to the heat of hydration of the amine. At the same time, the phenylmercuric acetate disproportionated to give a light, floccy suspension of diphenylmercury. This mixture was allowed to stand for about one hour. The floccy percipitate was filtered, washed with water and dried in air. It had a melting point of 120–124° C. (M.P. pure diphenylmercury =121.8° C.) Yield was 0.5 g. or about 94% of theoretical. The filtrate contained the rest of the mercury as a water-soluble complex of the polyamine-mercuric acetate.

EXAMPLE 2

These examples are similar to Example 1, except that the starting mercury compounds were phenylmercuric hydroxide, phenylmercuric benzoate and phenylmercuric chloride. One gram of the phenylmercuric salt was dispersed in about 2 g. of Dow PEI-6 and then 10–20 ml. water was added. Disproportionation spontaneously occurred when water was added and was essentially complete in one hour at a temperature of 20–50° C.; yield of diphenylmercury (M.P. 122–125° C.) was 85–95% in each case.

EXAMPLE 3

Two grams of phenylmurecuric acetate were mixed into 5 grams of ethylenediamine and 50 ml. of water added. Disproportionation occurred as water was added as evidenced by the formation of a floccy white precipitate from the dense white crystalline phenylmercuric acetate and the solution of about half of the starting solid. The mixture was warmed to 50° C. for thirty minutes, then the floccy precipitate of diphenylmercury was filtered off, washed with water and dried. Yield was 0.3 g. or 28%. Melting point was 122° C. Similar results and yields were obtained where the starting phenylmercuric salt was the hydroxide, benzoate and chloride. Likewise, higher polyamines such as diethylenetriamine and triethylenetetraamine were used in place of ethylenediamine and yields of diphenylmercury of.40–60% were obtained.

EXAMPLE 4

Ditolyl, dixylyl and dimesityl mercury were prepared by slurrying 5 grams of the corresponding aryl mercuric acetate in 15 grams of PEI-6, followed by the addition of 200 ml. of water at room temperature. The mixture was stirred for 1 hour and the precipitate filtered, washed, dried, weighed and analyzed. Results are tabulated below.

| Compound | Yield (g.) | | Analysis (percent Hg) | |
|---|---|---|---|---|
| | Found | Theoret. | Found | Theoret. |
| Ditolyl-Hg | 2.68 | 2.72 | 52.3 | 52.23 |
| Dixylyl-Hg | 2.75 | 2.81 | 48.9 | 48.8 |
| Dimesityl-Hg | 2.84 | 2.91 | 45.5 | 45.5 |

The extremely high yield (98%) and purity of these products illustrates the value of this process.

EXAMPLE 5

30 ml. of an acetic acid solution containing 53 millimoles of methylmercuric acetate was mixed with 40 ml. of polyethyleneimine (PEI 600) solution containing 33% of the polyamine. An exothermic reaction took place, mainly due to the reaction of excess acetic and the polyamine. The mixture was distilled at a temperature of 73–94° C. The distillate separated into two liquid layers. The bottom layer was separated. It weighed 9.15 grams and, after drying over $K_2CO_3$, was analyzed by vapor phase chromatography and compared to an authentic sample of dimethylmercury. Purity of the product prepared by this procedure was better than 99%. Its I.R. spectrum was consistent with that assigned to dimethylmercury. Yield was better than 75% of theory.

In a similar manner, diethyl, dipropyl and dibutyl mercury were prepared in high purity and good yield.

I claim:

1. In a method for preparing diorganic mercury compounds having the formula $R_2Hg$ where R is selected from the group consisting of alkyl, aryl, and amino, nitro and halogen substituted aryl groups by a reaction involving an organic mercury salt having the formula RHgX where X is selected from the group consisting of acetate, benzoate, hydroxide, oxide, chloride, bromide, iodide and nitrate groups, the improvement which consists in disproportionating said organic mercury salt by contacting the organic mercury salt with a liquor consisting of a polyamine in water, said polyamine being selected from the group consisting of a polyethyleneimine having a molecular weight between about 600 and 100,000, ethylenediamine, diethylenetriamine, triethylenetetraamine and propylenediamine thereby forming the water-insoluble diorganic mercury compound and a water-soluble mercury-polyamide complex, and separating the diorganic mercury compound from the reaction mixture.

2. The method as claimed by claim 1 wherein the polyamine is selected from the group consisting of a polyethyleneimine having a molecular weight between about 600 and 100,000, ethylenediamine, diethylenetriamine, triethylenetetraamine, and propylenediamine.

3. The method as claimed in claim 1 wherein the polyamine is a polyethyleneimine having a molecular weight of about 600.

4. The method as claimed by claim 1 wherein the organic mercury salt is a phenyl mercury salt.

5. The method as claimed by claim 1 wherein the organic mercury salt is a tolyl mercury salt.

6. The method as claimed by claim 1 wherein the organic mercury salt is mesityl mercury salt.

7. The method as claimed by claim 1 wherein the organic mercury salt is a xylyl mercury salt.

8. The method as claimed by claim 1 wherein the organic mercury salt is a methyl mercury salt.

9. The method as claimed by claim 3 wherein the organic mercury salt is selected from the group consisting of acetate, benzoate, hydroxide, oxide, chloride, bromide, iodide and nitrate.

10. The method as claimed by claim 3 wherein the organic mercury salt is a penyl mercury salt.

11. The method as claimed by claim 3 wherein the organic mercury salt is a tolyl mercury salt.

12. The method as claimed by claim 3 wherein the organic mercury salt is a mesityl mercury salt.

13. The method as claimed by claim 3 wherein the organic mercury salt is a xylyl mercury salt.

References Cited

UNITED STATES PATENTS

| | | | |
|---|---|---|---|
| 2,012,820 | 8/1935 | Kharasch | 260—431 X |
| 2,277,180 | 3/1942 | Wolff et al. | 260—431 |
| 2,619,446 | 11/1952 | Andersen | 260—433 X |
| 3,031,485 | 4/1962 | Cannon | 260—433 X |
| 3,106,572 | 10/1963 | Jolles | 260—433 |

TOBIAS E. LEVOW, Primary Examiner

H. M. S. SNEED, Assistant Examiner

U.S. Cl. X.R.

260—431